Aug. 29, 1939.  E. HANSON  2,170,818
INTERNAL COMBUSTION ENGINE
Filed Nov. 16, 1937   2 Sheets-Sheet 1

INVENTOR.
EDWARD HANSON.
BY Geo. B. Vitte
ATTORNEY.

Aug. 29, 1939.  E. HANSON  2,170,818
INTERNAL COMBUSTION ENGINE
Filed Nov. 16, 1937   2 Sheets-Sheet 2
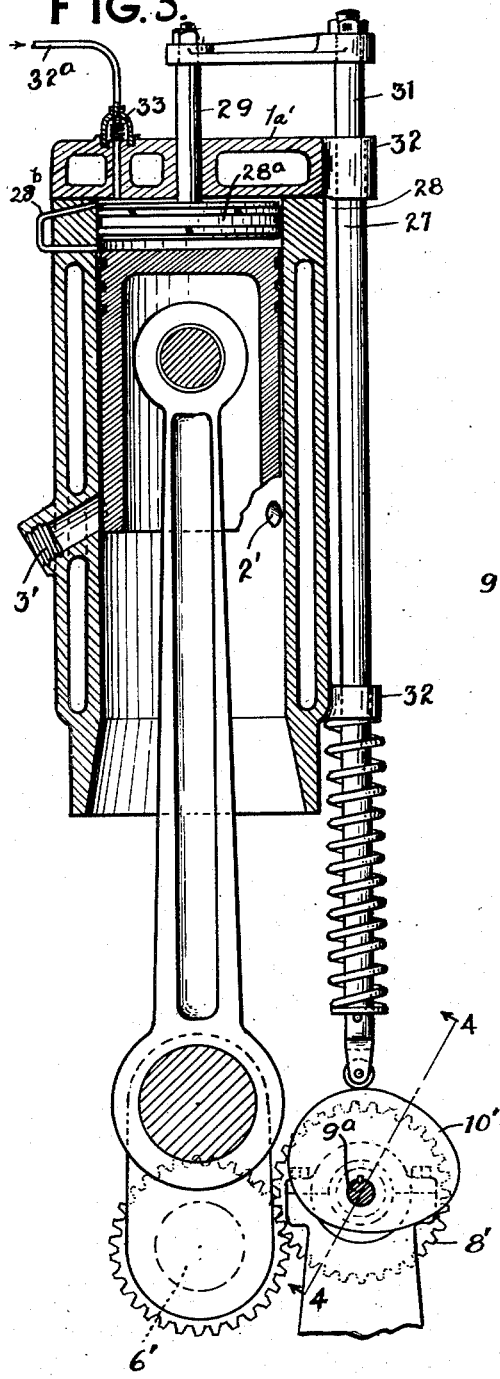
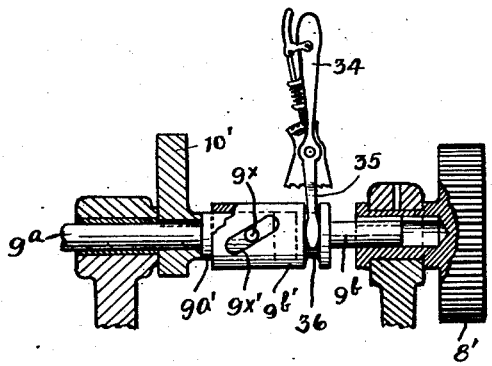
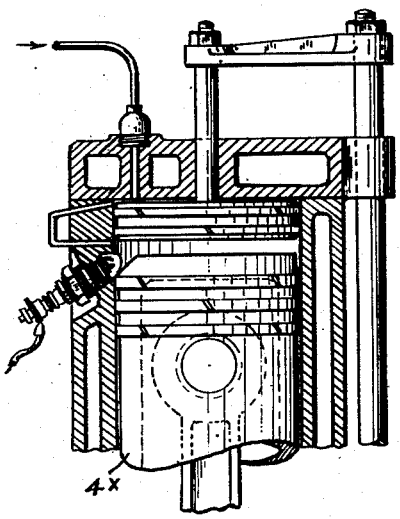
INVENTOR.
EDWARD HANSON.
BY Geo. B. Pitts
ATTORNEY.

Patented Aug. 29, 1939

2,170,818

UNITED STATES PATENT OFFICE 2,170,818

INTERNAL COMBUSTION ENGINE

Edward Hanson, Cleveland, Ohio

Application November 16, 1937, Serial No. 174,784

13 Claims. (Cl. 123—33)

This invention relates to improvements in fuel burning engines of the internal combustion type wherein compression is relied upon to effect the ignition of the fuel, but it is equally adapted to an engine operating under a low compression and in which the ignition of the fuel charge in the cylinder is produced by an electric spark, hot bulb or other ignition means, as herein illustrated.

This type of engine has many advantages in that it may utilize low grade hydro-carbon fuels such as the various grades of heavy fuel oils, and also the higher grades of liquid fuels, such as gasolene, kerosene, alcohol, etc., as well as any available gas or vapor that will, in combination with air under compression, form a combustible mixture, without any alterations to the engine or fuel injection systems, except that in an engine where the heat of compression is too low to ignite the fuel, other means for producing the ignition must be provided.

For the efficient operation of the engine it is essential that the fuel used be supplied to the engine in the form of vapor or gas. In the use of liquid fuel, a suitable type of carburetor is employed to vaporize the fuel with a small amount of air or inert gas so as to prevent ignition of the fuel vapor before it is finally injected into the combustion space. In the use of any of the permanent gases as fuel, the carburetor is dispensed with, the gas being piped directly into the fuel compression chamber.

One object of this invention is to provide improved means for introducing the fuel into an internal combustion engine in a gaseous or vaporized form so as to effect a more accurate means of measuring the quantity of fuel charge required for the combustion and insure increased efficiency.

Another object of the invention is to construct an internal combustion engine wherein is provided a combustion chamber separate from the engine cylinder and means are provided for exhausting the burnt gases of combustion from said chamber simultaneously with the exhaust from the engine cylinder by the exhaust stroke of the piston therein.

Another object of the invention is to provide an improved internal combustion engine utilizing fuel in gaseous or vaporized form and having a main cylinder and fuel compression and combustion chambers separate therefrom, and means for injecting the compressed fuel from the compression chamber into the combustion chamber.

Another object of the invention is to provide in an internal combustion engine utilizing fuel in gaseous or vaporized form, means operated by the air compressed by the engine piston in its compression stroke to compress the fuel in a chamber separate from the engine cylinder and separate means for increasing the fuel pressure in said chamber, whereby the fuel is forced from the chamber into the combustion chamber of the engine.

A further object of the invention is to provide an internal combustion engine utilizing gaseous or liquid fuel in vaporized form that is relatively simple in construction.

Another object is to provide means whereby the advancing or retarding of the period of combustion is controlled in a simple and efficient manner.

Other objects of the invention will be apparent to those skilled in the art to which my invention relates from the following description taken in connection with the accompanying drawings, wherein Fig. 1 is a sectional view of a four-cycle engine embodying my invention.

Fig. 2a is a diagram showing the movements of the pistons in the form of construction shown in Fig. 1.

Fig. 3 is a modified form of construction showing a two-cycle engine embodying my invention.

Fig. 4 is a fragmentary view showing the mechanism for controlling the fuel supply.

Fig. 5 is a fragmentary view illustrating another modification.

Figures 1, 1A, 2:
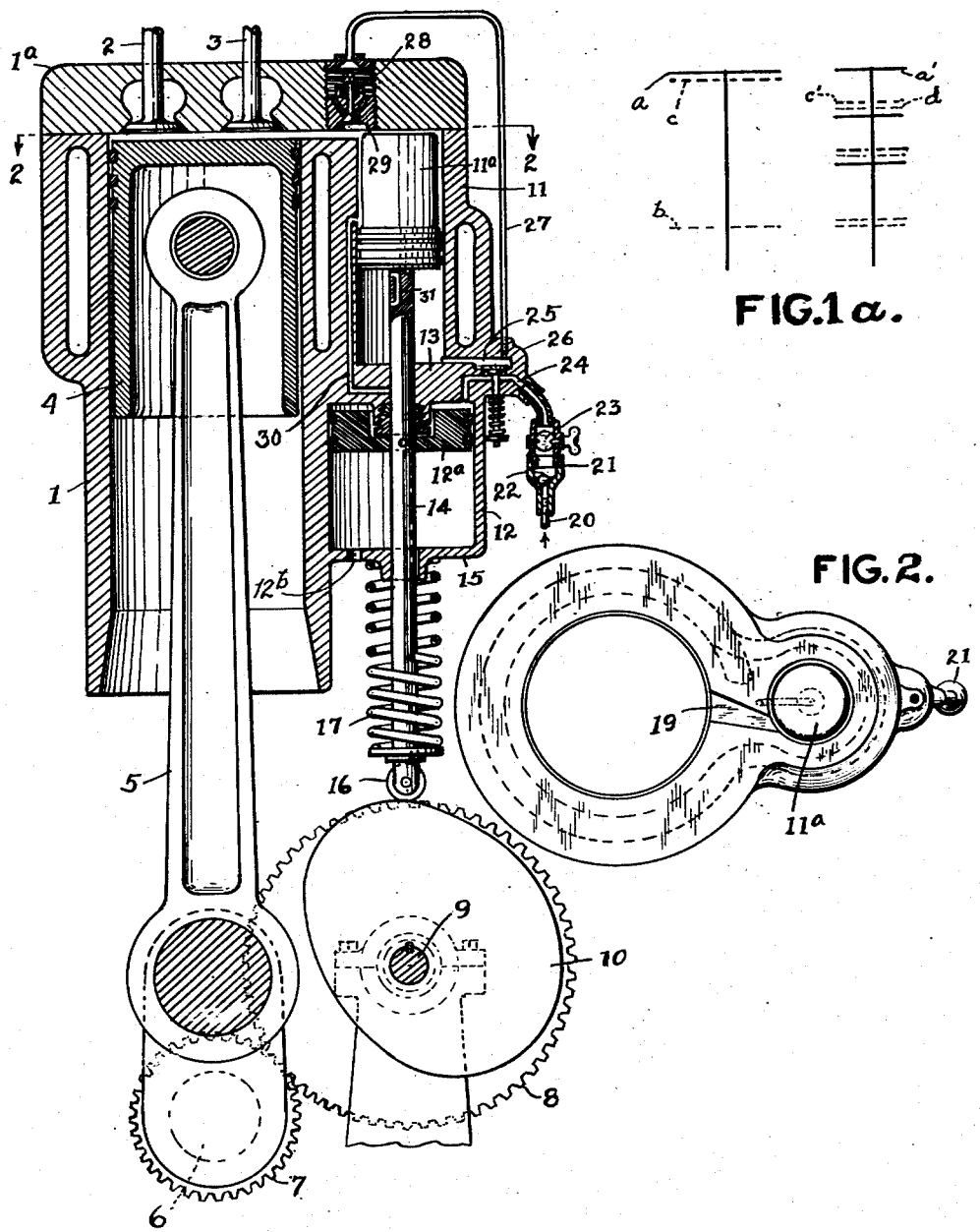
Fig. 2 is a plan view on the line 2—2 of Fig. 1.

Referring to Figs. 1 and 2, 1 indicates a cylinder having a removable head 1a provided with the usual inlet and exhaust valves 2, 3, at the top of the cylinder space. 4 indicates the piston, preferably of the trunk type, connected by a pitman or rod 5 to a crank shaft 6, the latter being provided with a gear 7 in mesh with a gear 8 fixed to a cam shaft 9 to drive a cam 10 for a purpose later set forth, the gears 7 and 8 being proportioned to drive the latter at one half the speed of the shaft 6. A shaft (not shown) by means of suitable cams (not shown) may be utilized to operate the inlet and exhaust valves 2, 3, in relation to the reciprocation of the piston 4 in a well known manner.

By preference, the walls of the cylinder 1, at one side, are shaped and constructed to form auxiliary cylinders 11, 12, in tandem relation, separated from each other by a transverse end wall 13, and containing pistons 11a, 12a, respectively connected to a rod 14. The cylinders 11, 12, are somewhat smaller than the cylinder 1, but the cylinder 12 is by preference larger than the cylinder 11, so as to provide an adequate predetermined quantity of fuel in each suction stroke thereof.

It will be understood that the engine may consist of as many main cylinders as desired, each preferably having associated with it a pair of tandem cylinders 11, 12. The space at the upper end of the cylinder 11 forms a combustion chamber; the piston 11a being at its lower position when combustion takes place, whereas the space at the lower end of the cylinder forms a chamber in which the fuel is compressed in the downward movement of the piston 11a. The upper end of the cylinder 11 communicates with the upper or head end of the cylinder 1, through a passage 19, so that in the compression stroke of the piston 4 the air compressed thereby will be effective upon the piston 11a to operate both pistons in one direction and upon combustion of the fuel in the cylinder 11 the force or pressure thereof will be effective upon the piston 4 whereby the latter makes its power stroke. The rod 14 extends through and is movable endwise in alined openings formed in the wall 13 and bottom wall 15 of the cylinder 12, the opening in the wall 13 being provided with a suitable packing gland to prevent the escape of the fuel during its compression in the cylinder 11, as later set forth. The bottom wall of the cylinder 12 is formed with an opening 12b for free flow of air therein and therefrom below the piston 12a, as the latter operates. The lower end of the rod 14 carries a roller 16 which rides on the cam 10. The cam 10 serves to move the rod 14 and pistons 11a, 12a, upwardly, whereas a coiled spring 17 interposed between the wall 15 and a collar 18 fixed to the rod 14, serves to actuate the pistons 11a, 12a, in their downward movement at a predetermined position of the piston 4 in its compression stroke, as later set forth. In such actuation the spring 17 constitutes an auxiliary means for operating the piston 11a, accelerating the speed thereof, and increasing the pressure of the compressed fuel in the compression chamber. The spring 17 also normally tends to move the rod 14 downwardly, whereby the roller 16 is maintained in engagement with the cam 10. The cam 10 is shaped to control the movements of the pistons in co-ordinated relation to the movement and positions of the piston 4 and operations of the valves 2, 3, whereby the fuel injection is effected at the desired position of the piston 4. The lower end of the piston 11a is provided with the usual rings to effect a seal between it and the cylinder walls, whereas its upper portion serves as a means for exhausting the burnt gases of combustion from the cylinder 11, in the upward stroke of the piston 11a. As shown, the upper portion of the piston 11a is reduced in diameter to prevent contact with the cylinder walls, so as to avoid conduction of heat therefrom. 20 indicates a fuel supply pipe leading from a carburetor (not shown) which is adapted to vaporize the fuel oil or other liquid fuel with a quantity of air less than that required to sustain combustion. A casing 21, interposed in the tube 20, is provided with a check valve 22 to prevent back flow of the vaporized fuel and a control valve 23, preferably of the butterfly type, to control the amount of fuel flowing through the tube. The tube 21 is connected to a duct 24 formed in the wall 13, the discharge end of the duct leading into the upper end of the cylinder 12. The duct 24 is connected to a by-pass 25 which leads into the lower end of the cylinder 11, and which is provided with a normally closed spring operated valve 26 arranged to permit flow of the fuel from the cylinder 12 to the cylinder 11, when the pistons in these cylinders move upwardly, but prevents flow of the fuel in the opposite direction. 27 indicates a conduit connected to the lower end of the cylinder 11 (preferably to the by-pass 25 above the valve 26) and to an opening 28 formed in the top wall 1a. The opening 28 is provided with a valve 29 the valve element of which is normally closed by a spring and arranged to admit compressed fuel supplied by the conduit 27 but to prevent back flow of the fuel into the conduit. 30 indicates an auxiliary conduit leading from the cylinder 11 below the piston 11a when in its lowest position to a point in the cylinder 11 above the piston 11a when in its highest position, that is, above that portion of the piston sealed by its piston rings. The auxiliary conduit 30 is shown extending through the wall 13 and adjacent cylinder wall, but in practice such conduit would consist of a pipe connected to ports formed in the wall of the cylinder 11. In the illustrated arrangement, the rod 14 is formed with a by-pass 31 to provide communication from the cylinder 11 to the inlet port of the conduit 31 when the piston 11a is at its lowest position.

In the drawing the piston 4 and the fuel compression piston 11a are both shown at the top of their respective strokes (position a, a'). The piston 4 is at the beginning of the intake or suction stroke so that in its movement downwardly fresh air is drawn into the cylinder 1. The vaporized fuel has been forced from the cylinder 12 into the cylinder 11 by reason of the previous upstroke of the pistons 11a, 12a. The pistons 11a, 12a, remain in their upper position, substantially as shown, during the suction or air intake stroke of the piston 4, and until the piston 4 begins its compression stroke (position b). The air admitted to the cylinder 1 is compressed to the desired degree by the piston 4 in its compression stroke and such air pressure is utilized to move the pistons 11a, 12a, downwardly, the movement of the piston 11a serving to compress the vaporized fuel in the cylinder 11 and the movement of the piston 12a serving to draw a fresh charge of vaporized fuel into the cylinder 12. At the predetermined position c of the piston 4 in its compression stroke, that is, at the position where fuel injection is to take place, the piston 11a, intermediate its complete stroke (position c'), is given a rapid impulse or acceleration under the influence of the spring 17, in co-action with the cam 10, the effect of which is to further compress the fuel and force it past the valve 29, whereby it is injected into the combustion space of the cylinder 11 and mixed with the compressed air therein to effect combustion. At the time of combustion of the fuel, piston 4 is substantially at position a and piston 11a is substantially at the end of its down stroke (position d). Since the air compressed in the cylinder 1 by the piston 4 acts on the piston 11a to compress the fuel in the compression chamber, the pressure on the opposite sides of the piston 11a is equal, so that very little auxiliary power, which is supplied by the spring 17, is required to accelerate the movement of the piston 11a thereby. It will be understood that the injection of fuel is controlled by the inlet valve 29 which is set to open at a predetermined pressure of the compressed fuel in the cylinder 11 and conduit 27. As the pressure in the cylinders 1 and 11 on one side of the valve 29 and the pressure in the cylinder 11 below the piston 11a on the other side of the valve is equalized, as the pressure of the compressed fuel is built up, the valve 29 will remain closed until such pressure is increased by the operation of the piston 11a under the influence of the spring 17, the action of which is controlled by the cam, to effect fuel injection into the combustion space. The movement of the piston 11a is controlled by the cam 10 so that its downward stroke is continued to position $d$ under the control thereof until after combustion of the compressed fuel supplied to the cylinder 11 takes place and the piston 4 starts its power stroke, whereby the piston 11a as it completes its stroke forces the compressed fuel remaining in the lower end of cylinder 11 through the by-pass 31 to the upper end of the cylinder 11 to effect combustion of any compressed air which may remain therein, following which the cam 10 will effect upward movement of the pistons 11a, 12a, to position $a'$ in co-ordinated relation to the exhaust stroke of the piston 4 to position $a$ so that the burnt gases of combustion in the upper ends of the cylinders 1 and 11 may escape through the exhaust valve 3.

From the foregoing description it will be noted that I provide a cylinder and a piston therein, the upper portion of the cylinder forming a combustion space, separate from but in communication with the engine cylinder and the lower portion of which forms a fuel compression space, so that the piston, which is acted upon by the air compressed in the engine cylinder serves to compress fuel admitted into this compression space; also, that by means of a spring acting on this piston the fuel is forced from this space into the combustion space. As the pressure on opposite sides of the piston is equalized throughout the compression stroke of the piston 4, the inlet valve remains closed and by regulating the spring pressure on this valve, fuel injection may be delayed until the fuel reaches a predetermined pressure under the influence of the spring 17 in operating the piston 11a.

The movement of the piston 11a may be advanced or retarded by substituting a cam 10 of different contour or by adjusting the cam angularly on the cam shaft 9, one form of adjusting means being shown in Fig. 4, to which reference will later be made.

Fig. 3 illustrates an engine of the two-cycle type embodying my invention. In this view, the cylinder 1' is formed with an air inlet 2' and exhaust outlet 3', controlled by the main piston 4'. In this form of construction, a separate piston 28a reciprocates in the cylinder 1' above the piston 4'. The piston 28a is connected to a rod 29, carried by an arm 30. The arm 30 is connected to a rod 31, which is reciprocated in guide devices 32, by means of a cam 10' and spring 17', the cam being rotated at the same speed as the crank shaft 6' and shaped to control the reciprocations of the piston 28a in co-ordinated relation to the movement of the piston 4'. The vaporized fuel is supplied by the conduit 32a to the cylinder 1' through duct 32a' opening thereinto above the piston 28a, a check valve 33 being provided to prevent back-flow of the fuel. The fuel is compressed in the cylinder 1' by the piston 28a. 28b indicates a conduit having ports which connect the upper end of the cylinder 1' with the latter at a point remote from such end, so that when the piston 28a moves downwardly, which movement is effected at the time the main piston is completing its power stroke, it closes the lower port. The port of the conduit 28b remote from the upper end of the cylinder 1' is connected to the latter at a point above the main piston 4' when at its upper position, so that this port will not be closed thereby, for a reason later to appear. The downward movement of the piston 28a serves to draw in a charge of fuel into the cylinder 1'. The piston 28a is moved downwardly by the spring 17' at the time the main piston 4' is at the end of its power stroke. The action of the spring 17' is controlled by the cam 10'; then as the main piston moves upwardly to compress the air (which is compressed between the pistons) admitted into the cylinder, the pressure of the air forces the piston 28a upwardly to compress the fuel between it and the head 1a'. In such upward movement the lower port is opened by the piston 28a to permit the compressed fuel to flow into the cylinder 1' in the space between the pistons for mixture with the compressed air, the effect of which is to cause combustion. The pistons 4', 28a, move upwardly simultaneously, but at different speeds, so that both complete their strokes at a predetermined position of the piston 4', such movement serving to compress the air admitted into the cylinder in the space between the pistons 4', 28a, and the latter piston serving to compress the fuel in the cylinder 28 which is in communication with the cylinder 1' through the conduit 28b. Accordingly, the compressed air and compressed fuel are brought into intimate contact to effect combustion when the piston 4' approaches the end of its up-stroke. In the down stroke of the piston 28a fuel is drawn into the cylinder 28 at the end of the down stroke of the piston 4' following the exhaust of the burnt gases of combustion and admission of a charge of fresh air to cylinder 1', as above set forth.

In Fig. 4, which is a fragmentary section on the line 4—4 of Fig. 3, but also represents a similar section of Fig. 1, the shaft 9 is formed of two parts 9a, 9b, and are provided with telescoping male and female members 9a', 9b', respectively, the part 9a carrying the cam 10' and the part 9b being keyed to and slidable in the hub of the gear 8' which is driven by the crank shaft as already described in connection with Figs. 1 and 3. The member 9a' is provided with a pin 9x which projects into a slot 9x' formed in the member 9b' to interlock these members together for rotative movement, the slot extending in a direction inclined to the axis of the shaft parts 9a, 9b. Accordingly, by sliding the part 9b and member 9b' endwise, the cam 10' will be adjusted about such axis.

The movement of the member 9b' may be effected by means of a trigger controlled lever 34 having a yoke 35 fitting into an annular groove 36 formed in the member 9b'.

Where a gaseous fuel is utilized the supply pipe therefor is connected to the duct 24 in the form of construction shown in Fig. 1 and to the duct 32a in the form of construction shown in Fig. 3.

It will be noted that in the four cycle type of engine, as shown in Figs. 1 and 2, by providing a different inlet and exhaust means, for the cylinder 1, for example, by means of a sleeve valve therein, the fuel compression piston may be mounted in the cylinder 1 between the piston 4 and cylinder head 1a.

Fig. 5 illustrates a form of construction of the two-cycle engine type when the compression in the cylinder is too low to effect combustion and auxiliary means are required to ignite the compressed fuel and air. In such a construction, I prefer to use a spark plug 37, which is supplied with electrical energy in any desired manner. In this arrangement, one side of the piston 4x is cut away to accommodate the inner end of the plug 37. A similar arrangement may be provided in the form of construction shown in Fig. 1.

To those skilled in the art to which my invention relates, many changes in construction and widely differing embodiments and applications of the invention will be apparent without departing from its spirit and scope. My disclosures and the description herein are purely illustrative and not intended to be in any sense limiting.

What I claim is:

1. An internal combustion engine comprising a main cylinder having air inlet and exhaust valves, a piston therein, a separate cylinder arranged to form at one end a combustion chamber in communication with one end of said main cylinder, the opposite end of said separate cylinder being arranged to form a fuel compression chamber, a conduit leading from said fuel compression chamber to said combustion chamber, means for supplying fuel into said compression chamber, a piston in said separate cylinder arranged to be operated by the air compressed by the piston in said main cylinder in the compression stroke thereof to compress the fuel in said fuel compression chamber, and mechanism for controlling the movement of said last mentioned piston in relation to the movement of said first mentioned piston, said mechanism including means for increasing the speed of said last mentioned piston at a predetermined position thereof in its compression stroke, whereby the compressed fuel is injected into said combustion chamber.

2. An internal combustion engine as claimed in claim 1 wherein said conduit is provided with a spring operated valve arranged to control the injection of the fuel into said combustion chamber.

3. An internal combustion engine as claimed in claim 1 wherein the last mentioned piston in its return stroke operates to exhaust the gases of combustion in said combustion chamber through said exhaust valve.

4. An internal combusion engine as claimed in claim 1 wherein is provided a separate fuel conduit between said fuel compression chamber and said combustion chamber when the piston therein is at the end of its compression stroke.

5. An internal combustion engine comprising a main cylinder having inlet and exhaust valves, a piston therein, a pair of cylinders disposed in tandem relation and provided with connected together pistons, one of said tandem cylinders being arranged to hold a predetermined quantity of fuel and connected with a fuel supply and the other tandem cylinder being arranged to form a compression chamber at one end and a combustion chamber at its other end connected to the head of said main cylinder, a valved conduit between said fuel holding cylinder and the compression chamber of the other cylinder, the compression of the air in said main cylinder in the compression stroke of its piston operating to move the pistons in said tandem cylinders in one direction, mechanism for operating the pistons in said tandem cylinders in the opposite direction, the movement of the pistons in said tandem cylinders in one direction operating to draw fuel into said fuel holding cylinder and compress the fuel in the compression chamber of the other tandem cylinder and their movement in the opposite direction operating to force the fuel from said holding cylinder into said other tandem cylinder and to exhaust gases of combustion from the latter cylinder, and means co-acting with said mechanism and arranged to operate at a predetermined position of the piston in said main cylinder in its compression stroke for increasing the speed of the pistons in said tandem cylinders whereby the fuel being compressed in said fuel compression chamber is forced into said combustion chamber.

6. An internal combustion engine comprising main and secondary cylinders and reciprocatable pistons therein in opposed relation and forming a combustion space betwen them, a duct connecting said cylinders above their pistons, said main cylinder having an air inlet and an exhaust and the piston therein serving to compress the air in said cylinder in its compression stroke and said secondary cylinder having a fuel inlet and the piston therein serving to draw the fuel into said cylinder, compress it therein and force the fuel through said duct into said combustion space, and means for controlling the movement of the piston in said secondary cylinder in relation to the movement of the other piston, whereby the fuel is compressed substantially simultaneously with the compression of air in the main cylinder and fuel is drawn into the secondary cylinder following the power stroke of the piston in said main cylinder.

7. An internal combustion engine comprising a main cylinder having air inlet and exhaust valves, a piston therein, a secondary cylinder forming at one end a combustion chamber connected to the head end of said main cylinder and a compresssion chamber at its other end, a piston reciprocatable in said secondary cylinder and arranged to be operated in a direction to compress fuel in said compression chamber by the pressure of the air compressed in said main cylinder, a conduit between said chambers, means for operating the piston in the secondary cylinder in the opposite direction, and separate means under control of said operating means for accelerating the movement of the piston in said secondary cylinder during its movement to compress the fuel in said compression cylinder and force the fuel into said combustion chamber.

8. An internal combustion engine as claimed in claim 7 wherein provision is made to prevent injection of fuel into said combustion chamber until the fuel has been compressed to a predetermined degree.

9. In an internal combustion engine of the two cycle type, the combination of a cylinder having an air inlet and an exhaust port, a fuel inlet in the upper end of said cylinder, a reciprocatable main piston in said cylinder, a separate reciprocatable piston in said cylinder and forming with said main piston a combustion space in said cylinder and arranged to be operated upwardly by the compressed air in the up-stroke of said main piston, whereby fuel admitted to said cylinder is compressed by said separate piston, a conduit leading from the upper end of said cylinder to a port disposed in the wall of said cylinder above the main piston when in its uppermost position, said separate piston being arranged to close said port when moved downwardly, and means for moving said separate piston downwardly at a predetermined position of said main piston.

10. In an internal combustion engine, the combination of a cylinder and a reciprocatable piston therein, means for supplying air into said cylinder to be compressed by said piston, a fuel supply, and means for compressing the fuel and mixing it with the air compressed by said piston, said fuel compressing means including a separate piston arranged to be operated in one direction by the pressure of the compressed air, the movement of said separate piston, following the compression of the fuel thereby, operating to control the mixture of the compressed fuel with the compressed air, and mechanism for operating said separate piston in the opposite direction.

11. An internal combustion engine as claimed in claim 10, wherein a spring operated valve controls the mixture of the compressed fuel with the compressed air.

12. In an internal combustion engine, the combination with a crank shaft, of a cylinder having an air inlet and an exhaust, a main piston therein connected to said crank shaft, a separate piston in said cylinder between said main piston and the head for said cylinder, a fuel supply connected to the head end of said cylinder, a conduit leading from the head end of said cylinder to a port formed in the wall of said cylinder above the main piston when at the end of its compression stroke, and means for moving said separate piston away from said cylinder head to draw in a supply of fuel and to close said port when said main piston is substantially at the end of its power stroke, said main piston in its compression stroke serving to compress air admitted to said cylinder between it and said separate piston, whereby the latter is moved toward said cylinder head to compress the fuel and open said port to permit the compressed fuel to flow through said conduit for mixture with the compressed air.

13. An internal combustion engine as claimed in claim 12 wherein a driven cam controls the operation of said separate piston to close said port.

EDWARD HANSON.